United States Patent
Watanabe et al.

(10) Patent No.: US 10,249,281 B2
(45) Date of Patent: Apr. 2, 2019

(54) FELT, SOUNDPROOFING MATERIAL AND METHOD FOR PRODUCING SOUNDPROOFING MATERIAL

(71) Applicant: Nihon Tokushu Toryo Co., Ltd., Kita-ku, Tokyo (JP)

(72) Inventors: Yuji Watanabe, Tokyo (JP); Takanori Yumoto, Tokyo (JP); Asako Shinoka, Tokyo (JP)

(73) Assignee: Nihon Tokushu Toryo Co., Ltd., Kita-ku, Tokyo (JP)

( * ) Notice: Subject to any disclaimer, the term of this patent is extended or adjusted under 35 U.S.C. 154(b) by 0 days.

(21) Appl. No.: 15/108,460

(22) PCT Filed: Dec. 27, 2013

(86) PCT No.: PCT/JP2013/085173
§ 371 (c)(1),
(2) Date: Jun. 27, 2016

(87) PCT Pub. No.: WO2015/097885
PCT Pub. Date: Jul. 2, 2015

(65) Prior Publication Data
US 2016/0329038 A1    Nov. 10, 2016

(51) Int. Cl.
*D04H 1/10* (2006.01)
*G10K 11/162* (2006.01)
(Continued)

(52) U.S. Cl.
CPC ............ *G10K 11/162* (2013.01); *B60R 13/08* (2013.01); *D04H 1/08* (2013.01); *D04H 1/09* (2013.01);
(Continued)

(58) Field of Classification Search
CPC ................ G10K 11/162; G10K 11/168; B60R 13/0815; D04H 1/08; D04H 1/10; D04H 1/14; D04H 1/435
See application file for complete search history.

(56) References Cited

U.S. PATENT DOCUMENTS 4,128,679 A * 12/1978 Pohland ................. D04H 1/542
156/148
5,154,798 A * 10/1992 Melacini ................ D21H 13/40
162/145
(Continued)

FOREIGN PATENT DOCUMENTS

CN      101046063 A     10/2007
EP      0299536 B1 *    2/1993 ............. D21H 13/40
(Continued)

OTHER PUBLICATIONS

Mar. 25, 2014—Written Opinion—App PCT/JP2013/085173.
(Continued)

*Primary Examiner* — Edgardo San Martin
(74) *Attorney, Agent, or Firm* — Banner & Witcoff, Ltd.

(57) ABSTRACT

The invention provides a soundproofing material having excellent heat resistance, and, as a felt that is moldable into a soundproofing material at a low temperature, a felt which contains 10 mass % to 90 mass % of an unstretched thermoplastic resin fiber, and has a thickness of 0.05 mm to 100 mm, and an areal weight of 50 g/m² to 2 kg/m².

16 Claims, 1 Drawing Sheet

(51) Int. Cl.

| | | |
|---|---|---|
| *D04H 1/435* | (2012.01) | |
| *D04H 1/46* | (2012.01) | |
| *D04H 1/732* | (2012.01) | |
| *D04H 1/08* | (2012.01) | |
| *D04H 1/09* | (2012.01) | |
| *D04H 1/4274* | (2012.01) | |
| *B60R 13/08* | (2006.01) | |
| *D04H 1/12* | (2006.01) | |
| *D04H 1/14* | (2006.01) | |
| *B60R 13/00* | (2006.01) | |

(52) U.S. Cl.
CPC ............... *D04H 1/12* (2013.01); *D04H 1/14* (2013.01); *D04H 1/4274* (2013.01); *D04H 1/435* (2013.01); *D04H 1/46* (2013.01); *D04H 1/732* (2013.01); *D10B 2505/12* (2013.01)

(56) References Cited

U.S. PATENT DOCUMENTS

| | | | | |
|---|---|---|---|---|
| 5,185,195 A | * | 2/1993 | Harpell | B32B 7/08 2/2.5 |
| 6,610,928 B2 | * | 8/2003 | Synder | F16L 59/029 138/149 |
| 2010/0015406 A1 | * | 1/2010 | Bhatnagar | B32B 5/26 428/193 |

FOREIGN PATENT DOCUMENTS

| | | |
|---|---|---|
| EP | 1182087 A2 | 2/2002 |
| EP | 1988118 A1 | 11/2008 |
| JP | S63-120152 A | 5/1988 |
| JP | H05-132841 A | 5/1993 |
| JP | H06-003999 A | 1/1994 |
| JP | 06064053 A * | 3/1994 |
| JP | 08025492 A * | 1/1996 |
| JP | 2009-249803 A | 10/2009 |
| JP | 2012-024955 A | 2/2012 |
| JP | 2014-005573 A | 1/2014 |
| WO | 2011/045950 A1 | 4/2011 |

OTHER PUBLICATIONS

Apr. 20, 2017—(CN) The First Office Action—App 201380081901.1, Machine Eng Tran.
Jul. 25, 2017—(JP) Notification of Reasons for Refusal—App 2015-554463, Eng Tran.
Jun. 19, 2017—(EP) Extended Search Report—App 13900334.7.
Mar. 25, 2014—International Search Report—Intl App PCT/JP2013/085173.
Jan. 10, 2018—(CN) The Second Office Action—App 201380081901.1, Eng Tran.
Akihiro Suzuki et al., "Changes in Superstructure of Hot-Drawn Nylon 6 Fibers during Drawing", Kobunshi Ronbunshu, 1993, vol. 50, Issue 2, pp. 107-113.
Feb. 1, 2019—(CN) The Decision of Final Rejection—App 201380081901.1, Eng Tran.

* cited by examiner

FELT, SOUNDPROOFING MATERIAL AND METHOD FOR PRODUCING SOUNDPROOFING MATERIAL

CROSS REFERENCE TO RELATED APPLICATIONS

This is a U.S. National Phase Application under 35 U.S.C. § 371 of International Application No. PCT/JP2013/085173, filed Dec. 27, 2013, the entire disclosure of which is incorporated herein by reference.

TECHNICAL FIELD

The present invention relates to a felt, a soundproofing material molded from a felt, and a method for producing a soundproofing material.

BACKGROUND ART

A variety of soundproofing materials are installed in the engine room, dash areas, ceiling, floor sections, trunk, and various other parts of automobiles to reduce noise.

For example, Patent Document 1 describes producing a soundproofing material having excellent moldability and shape retention using a bulky felt containing a binder made of thermoplastic resin fibers.

Patent Document 2 describes using a laminated composite material of a nonwoven fabric of a polyester fiber having specific ranges of basis weight and bulk density and a surface coating material of a polyester fiber having specific breathability to produce a sound absorbing material having excellent heat resistance and applicable to the engine room of automobiles.

PRIOR ART DOCUMENT

Patent Document

Patent Document 1: JP-A-5-132841
Patent Document 2: JP-A-2012-24955

SUMMARY OF THE INVENTION

Problems that the Invention is to Solve

However, for example, many of today's automobiles are equipped with downsized engines for improved fuel economy, with superchargers installed to improve output. However, because heat discharge from engines increase by installing superchargers, and the soundproofing materials used for automobiles, particularly in the engine room, require improved heat resistance.

Thermoplastic resin fibers such as polyester fibers, used as raw materials of soundproofing materials are stretched and crystallized in the manufacturing process, and have high melting points. Therefore, in molding thermoplastic resin fibers as a soundproofing material, it is necessary to mold thermoplastic resin fibers at a temperature equal to or greater than their melting points.

There is a method that uses a conjugate fiber of a core-in-sheath structure containing a thermoplastic resin fiber such as a polyester fiber as the core portion, and a binder resin fiber having a lower melting point as the sheath portion to enable molding at or below the melting point. However, because a felt obtained by molding a fiber of such a core-in-sheath structure is bound by a low-melting-point binder, the product has poor heat resistance as a soundproofing material, and is practically unusable in the engine room, where the temperature becomes high.

For example, a felt obtained by using a conjugate fiber having a sheath portion with a melting point of 110° C. can be molded at a temperature of 110° C. or more for soundproofing material applications. However, in an environment with a temperature of 110° C. or more, the binder resin fiber softens, and fails to maintain the adhesion between the fibers. This makes it difficult to maintain the shape of the soundproofing material.

It might be possible to use a binder having a high melting point of, for example, 200° C. or more. However, this necessitates facilities that enable high-temperature molding, and is problematic in terms of facility endurance and cost.

Moreover, a soundproofing material made of a thermosetting felt involves fiber degradation due to burning after long exposure to temperatures of 160° C. or more, and the strength suffers as the thermosetting resin used as the binder becomes brittle. This causes the soundproofing material to readily bend or crack, and makes the soundproofing material practically unusable in the vicinity of an engine, where the temperature becomes high.

Accordingly, there is a need for a felt that can be molded at a temperature below the melting point of a binder resin fiber having a high melting point (preferably, a melting point of 200° C. or more), and that, once molded, can form a soundproofing material having excellent heat resistance (preferably, heat resistance to 160 to 230° C.).

It is an object of the present invention to provide a felt that can be molded at a temperature below the melting point of a binder resin fiber having a high melting point (preferably, a melting point of 200° C. or more), and that, once molded, can form a soundproofing material having excellent heat resistance (preferably, heat resistance to 160 to 230° C.).

Means for Solving the Problems

The foregoing problems can be solved by the following configurations.

(1) A felt comprising 10 mass % to 90 mass % of an unstretched thermoplastic resin fiber, and having a thickness of 0.05 mm to 100 mm, and an areal weight of 50 g/m$^2$ to 2 kg/m$^2$.
(2) The felt according to (1),
   wherein the unstretched thermoplastic resin fiber is an unstretched polyester fiber.
(3) The felt according to (1) or (2), further comprising an inorganic fiber, a stretched thermoplastic resin fiber, a low-melting-point fiber, or a natural fiber in 90 mass % or less of the total mass of the felt.
(4) The felt according to any one of (1) to (3), comprising 50 mass % to 80 mass % of the unstretched thermoplastic resin fiber, and 20 mass % to 50 mass % of an inorganic fiber.
(5) The felt according to any one of (1) to (4),
   wherein the felt is a monolayer felt.
(6) The felt according to any one of (1) to (5),
   wherein the felt is combinable with a nonwoven fabric to which design or other functionality is imparted.
(7) A soundproofing material molded from the felt of any one of (1) to (6).
(8) The soundproofing material according to (7),
   wherein the soundproofing material is for use in automobiles.
(9) A method for producing a soundproofing material,
   the method comprising a step of molding the felt of any one of (1) to (6) at a temperature below the melting point of a stretched thermoplastic resin fiber made of a thermoplastic resin same as the unstretched thermoplastic fiber contained in the felt.

Advantage of the Invention

The present invention can provide a felt that can be molded at a temperature below the melting point of a binder resin having a high melting point (preferably, a melting point of 200° C. or more), and that, once molded, can form a soundproofing material having excellent heat resistance (preferably, heat resistance to 160 to 230° C.). The soundproofing material of the present invention has excellent heat resistance because the unstretched thermoplastic resin contained in the raw material felt crystallizes in molding process, and shows the same melting point as that of a stretched thermoplastic resin fiber. The soundproofing material of the present invention is therefore suited as a soundproofing material for automobiles, and can be used in places requiring high heat resistance to temperatures of about 160 to 200° C., particularly in the vicinity of engines and engine pipes.

MODE FOR CARRYING OUT THE INVENTION

[Felt]

Figure 1:
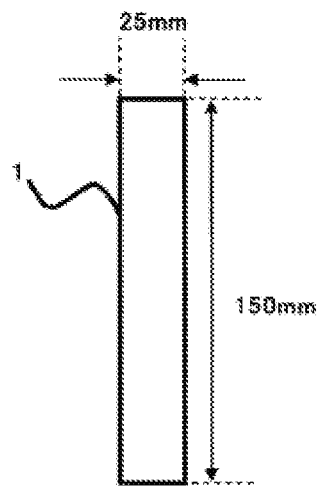
FIG. 1 is a plan view of a soundproofing material used in a sagging test of Examples, as viewed in thickness direction.

A felt of the present invention contains 10 mass % to 90 mass % of a thermoplastic resin fiber involving a low spinning stretch rate (hereinafter, referred to as "unstretched"), and has a thickness of 0.05 mm to 100 mm, and an areal weight of 50 g/m$^2$ to 2 kg/m$^2$.

The felt of the present invention is a felt-like material with a fulled unstretched thermoplastic resin fiber. The felt-like material is preferred for use as a molding material for a soundproofing material.

(Unstretched Thermoplastic Resin Fiber)

The unstretched thermoplastic resin fiber contained in the felt of the present invention is a fiber of a thermoplastic resin that is unstretched in a thermoplastic resin manufacturing process, specifically an amorphous thermoplastic resin. On the other hand, a thermoplastic resin that is heat stretched, and crystallized in a manufacturing process is used as a stretched thermoplastic resin fiber.

In contrast to the stretched thermoplastic resin fiber (a fiber of a stretched thermoplastic resin) having a high melting point, the unstretched thermoplastic resin fiber has a glass transition point of 60 to 80° C., and can be molded by being heat pressed and the like at a temperature of 80° C. and higher. After molding, the unstretched thermoplastic resin fiber has excellent heat resistance because, once molded, the thermoplastic resin is crystallized, and shows the same melting point as that of the stretched thermoplastic resin fiber.

For example, a polyethylene terephthalate fiber is typically crystallized by being stretched 3 to 5 times at 80 to 100° C., and has a melting point of about 254° C. In contrast, an unstretched polyethylene terephthalate fiber has a low stretch rate of about 1 to 1.5 times, and the thermoplastic resin remains amorphous, and has a glass transition point of about 80° C. and a shape unstable to heat. But, crystallization of the polyethylene terephthalate proceeds upon being molded at a temperature of 80° C. or more. After molding, the fiber has the properties of crystalline polyethylene terephthalate with a melting point of about 254° C., and becomes a high-heat-resistance material. A reversible reaction, such as softening at 80° C. to 254° C. temperatures, also does not occur. As noted above, "unstretched" as used herein refers to not only fibers that are not stretched at all, but to fibers that are stretched to such an extent that crystallization does not take place.

As the unstretched thermoplastic resin fiber, unstretched polyester fiber, unstretched polyamide fiber, unstretched acryl fiber, and unstretched polyolefin fiber and the like are preferable, and unstretched polyester fiber is more preferable from the standpoint of heat resistance.

As the unstretched polyester fiber, unstretched polyethylene terephthalate (PET) fiber, unstretched polybutylene terephthalate (PBT) fiber, unstretched polyethylene naphthalate (PEN) fiber, unstretched polycyclohexylenedimethylene terephthalate (PCT) fiber, unstretched polytrimethylene terephthalate (PTT) fiber, and unstretched polytrimethylene naphthalate (PTN) fiber and the like are exemplified, and unstretched polyethylene terephthalate (PET) fiber is particularly preferable.

The felt of the present invention contains 10 mass % to 90 mass % of an unstretched thermoplastic resin fiber, and more preferably contains 20 mass % to 80 mass % of the unstretched thermoplastic resin fiber. Further preferably, the felt of the present invention contains 50 mass % to 80 mass % of an unstretched thermoplastic resin fiber.

The unstretched thermoplastic resin fiber contained in the felt of the present invention can be one produced by using a known producing method such as melt-spinning.

The felt of the present invention may contain a component other than the unstretched thermoplastic resin fiber for purposes such as improving heat resistance, improving rigidity, and lowering manufacturing costs.

As the component that may be contained in the felt of the present invention in addition to the unstretched thermoplastic resin fiber, an inorganic fiber, a stretched thermoplastic resin fiber, a low-melting-point fiber, and a natural fiber and the like are exemplified. The component other than the unstretched thermoplastic resin fiber is preferably contained in an amount of 10 mass % to 90 mass % of the total mass of the felt.

As the inorganic fiber, glass fiber, rock wool, aluminum fiber, carbon fiber, and mineral fiber (such as basalt) are preferable, and glass fiber is more preferable.

When the felt of the present invention contains an inorganic fiber, a content of the inorganic fiber is preferably 10 mass % to 90 mass % of the total mass of the felt, and is preferably 20 mass % to 50 mass % when high-temperature shape retention is desired.

The felt of the present invention preferably contains 50 mass % to 80 mass % of an unstretched thermoplastic resin fiber, and further 20 mass % to 50 mass % of an inorganic fiber.

As the stretched thermoplastic resin fiber, a stretched polyester fiber, a stretched polyamide fiber, a stretched acryl fiber, and a stretched polyolefin fiber and the like are preferable, and a stretched polyester fiber is more preferable. As the polyester fiber, for example, polyethylene terephthalate (PET) fiber, polybutylene terephthalate (PBT) fiber, polyethylene naphthalate (PEN) fiber, polycyclohexylenedimethylene terephthalate (PCT) fiber, polytrimethylene terephthalate (PTT) fiber, and polytrimethylene naphthalate (PTN) fiber and the like are exemplified, and polyethylene terephthalate (PET) fiber is particularly preferable for its market size and availability.

When the felt of the present invention contains a stretched thermoplastic resin fiber, a content of the stretched thermoplastic resin fiber is preferably 10 mass % to 90 mass %, further preferably 20 mass % to 50 mass % of the total mass of the felt.

As the low-melting-point fiber, low-melting-point polyester fiber, conjugate fiber, and polyolefin fiber are preferable.

When the felt of the present invention contains a low-melting-point fiber, a content of the low-melting-point fiber is preferably 10 mass % to 90 mass %, further preferably 20 mass % to 50 mass % of the total mass of the felt.

As the natural fiber, cotton, hemp, jute, wool, and silk are preferable.

When the felt of the present invention contains a natural fiber, a content of the natural fiber is preferably 10 mass % to 90 mass %, further preferably 20 mass % to 50 mass % of the total mass of the felt.

The felt of the present invention is preferably a monolayer felt.

The felt of the present invention is preferably a felt that can be combined with a nonwoven fabric to which design or other functionality is imparted.

The felt of the present invention can be produced by felting an unstretched thermoplastic resin fiber by using a known method. As a method for producing the felt, for example, a method by making fleece from an unstretched thermoplastic resin fiber by using a dry method or a wet method, and joining fibers by needle punching or hydroentanglement to improve handling of the felt is exemplified. A component other than the unstretched thermoplastic resin fiber may be felted after being mixed with the unstretched thermoplastic resin fiber, or may be added after felting the unstretched thermoplastic resin fiber.

[Soundproofing Material]

The soundproofing material of the present invention is produced by molding the felt.

The soundproofing material of the present invention has excellent heat resistance (preferably, heat resistance to 160 to 230° C.) because the unstretched thermoplastic resin contained in the raw material felt shows the same melting point as that of a stretched thermoplastic resin fiber upon being crystallized in the molding process. The soundproofing material of the present invention is thus preferred for use as a soundproofing material for automobiles, particularly as a soundproofing material for engine rooms. For example, a soundproofing material obtained by molding the felt containing an unstretched polyester resin fiber is effective for use in an environment where the temperature reaches 160° C. to 200° C.

For the production of the soundproofing material of the present invention, a temperature in molding the felt may be a temperature equal to or greater than the glass transition point of the unstretched thermoplastic resin fiber contained in the felt, and the felt can be molded below the melting point of a stretched thermoplastic resin fiber of the same thermoplastic resin. The soundproofing material of the present invention is therefore also desirable in terms of production facilities and manufacturing cost.

The molding temperature is preferably 80° C. to 200° C., for example, when the felt containing an unstretched polyester resin fiber is used.

The felt of the present invention may be molded by using molding methods used in heat pressing.

The soundproofing material of the present invention preferably has a thickness of 0.05 mm to 100 mm, and an areal weight of 50 g/m$^2$ to 2 kg/m$^2$, particularly preferably a thickness of 1 mm or more and less than 10 mm, and an areal weight of 500 g/m$^2$ or more and less than 1600 g/m$^2$.

The soundproofing material of the present invention may be one produced by molding a laminate of the felt combined with a nonwoven fabric to which design or other functionality is imparted.

Examples

The present invention is described below in greater detail referring to Examples. The present invention, however, is not limited by the following Examples.

[Felt Production]

The materials shown in Table 1 were mixed in the mixture ratios given in Table 1, and air-laid and needled in a fleece line to produce a felt.

The felt thickness was adjusted to 10 mm for all samples.
The felts had the following areal weights.
Areal weight of felt 1: 1000 g/m$^2$
Areal weight of felt 2: 1000 g/m$^2$
Areal weight of felt 3: 1000 g/m$^2$
Areal weight of felt 4: 1000 g/m$^2$
Areal weight of felt 5: 1000 g/m$^2$
Areal weight of felt 6: 1000 g/m$^2$

TABLE 1

|  | Unstretched PET fiber | Glass fiber | Stretched PET fiber | Low-melting-point PET fiber | Note |
| --- | --- | --- | --- | --- | --- |
| Felt 1 | 50 mass % | 50 mass % | — | — | Example |
| Felt 2 | 80 mass % | 20 mass % | — | — | Example |
| Felt 3 | 80 mass % | — | 20 mass % | — | Example |
| Felt 4 | 60 mass % | — | 20 mass % | 20 mass % | Example |
| Felt 5 | 100 mass % | — | — | — | Comparative Example |
| Felt 6 | 5 mass % | 95 mass % | — | — | Comparative Example |

The following materials were used.
Unstretched PET fiber (fiber diameter: 3.3 dTex to 5.3 dTex, length: 38 to 44 mm)
Glass fiber (fiber diameter: 9 μm, length: 50 to 75 mm)
Stretched PET fiber (fiber diameter: 7.8 dTex, length: 38 mm)
Low-melting-point PET fiber (a fiber of a core-in-sheath structure with a stretched PET fiber at the core portion, and a PET with a melting point of 110° C. at the sheath portion; fiber diameter: 4.4 dTex, length: 55 mm)

[Production of Soundproofing Material]

Felts 1 to 6, each measuring 300 mm in length and 300 mm in width, were used and, as for each felt, molding was tried as soundproofing material having a thickness of 3 mm, by using a heat press.

The molding conditions are as follows.
Upper and lower mold temperature: 200° C.
Molding time: 90 sec

[Moldability Check]

The molded products using felts 1 to 6 were checked for distance along the thickness, length, and width directions with a slide gauge to find whether the products had the intended shape.

Felts 1 to 4 were moldable into soundproofing materials of the intended thickness.

Felt 5 shrunk while being molded, and the molded product had a length of 240 mm and a width of 240 mm, felt 5 was not able to be molded to the intended shape. Specifically, felt 5 was unsuitable as a raw material of a soundproofing material.

Felt 6 produced a molded product with a thickness of 8 mm, and was unable to be compressed to the intended thickness. Failing to maintain strength as a soundproofing material, felt 6 was unsuitable as a raw material of a soundproofing material.

[Extent of External Color Change]

The soundproofing materials 1 to 4 produced were visually inspected for the extent of external color change after being placed in a 170° C. environment for 500 hours, and in a 200° C. environment for 500 hours.

External color changes were checked by visually inspecting the extent of color change from the initial color.

The extent of external color change is presented in Table 2.

[Sagging Test]

The soundproofing materials 1 to 4 produced were used to perform a sagging test, as follows.

Figure 2:
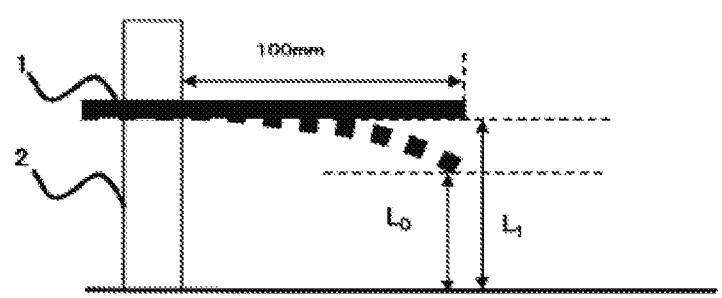
FIG. 2 is a diagram representing how a soundproofing material is installed for a sagging test of Examples.

A test piece 1 measuring 3 mm in thickness, 150 mm in length, and 25 mm in width shown in FIG. 1 was fixed on a support 2 in such a manner that the distance from one end of the soundproofing material 1 was 100 mm, as shown in FIG. 2. The test piece was then checked for sag ($\Delta t$) by measuring the initial minimum height ($L_1$) of the test piece, and the minimum height ($L_0$) after the test piece was placed in a 170° C. environment for 500 hours, and in a 200° C. environment for 500 hours.

Sag ($\Delta t$) was measured according to the following formula 1.

$$\text{Sag}(\Delta t) = L_1 - L_0 \qquad \text{Formula 1}$$

The sags were presented in Table 2.

[Strength Retention]

The soundproofing materials 1 to 4 produced were measured for strength retention to determine whether the materials retained rigidity after being exposed to heat. Strength retention was calculated under the following conditions.

The test piece 1 measuring 3 mm in thickness, 150 mm in length, and 25 mm in width shown in FIG. 1 was used to determine the initial tensile strength ($F_0$), and the tensile strength ($F_1$) after the test piece was placed in a 170° C. environment for 500 hours, by using the JIS-L-3204 7.4 method.

Strength retention (%) was calculated according to the following formula 2. The strength retention values were presented in Table 2.

[Math. 1]

$$\text{Strength retention}(\%) = \frac{\text{Tensile strength value after high temperature test }(F_1)}{\text{Initial tensile strength value }(F_0)} \times 100 \qquad \text{Formula 2}$$

[Soundproofing]

The soundproofing materials 1 to 4 produced were measured for initial sound absorption by acoustic tube, and sound absorption by acoustic tube after the soundproofing materials were placed in a 170° C. environment for 500 hours, and in a 200° C. environment for 500 hours, by using a JIS-A-1405-2.

Table 3 presents the measured normal incidence sound absorption values (1 kHz, 2 kHz, 4 kHz).

TABLE 2

| | Raw material felt | After 170° C. × 500 hours | | | After 200° C. × 500 hours | |
|---|---|---|---|---|---|---|
| | | Extent of external color change | Sag | Strength retention | Extent of external color change | Sag |
| Soundproofing material 1 | Felt 1 | Slight discoloration | 1 mm | 121% | Slight discoloration | 3 mm |
| Soundproofing material 2 | Felt 2 | Slight discoloration | 1 mm | 102% | Slight discoloration | 3 mm |
| Soundproofing material 3 | Felt 3 | Slight discoloration | 4 mm | 74% | Slight discoloration | 30 mm |
| Soundproofing material 4 | Felt 4 | Slight discoloration | 3 mm | 36% | Discoloration | 35 mm |
| Soundproofing material 5 | Felt 5 | Unmoldable and unmeasurable | | | | |
| Soundproofing material 6 | Felt 6 | Unmoldable and unmeasurable | | | | |

TABLE 3

| | Sound proofing (normal incidence sound absorption) Unit: % | | | | | | | | | |
|---|---|---|---|---|---|---|---|---|---|---|
| | Raw material felt | Initial | | | 170° C. × 500 hours | | | 200° C. × 500 hours | | |
| | | 1 kHz | 2 kHz | 4 kHz | 1 kHz | 2 kHz | 4 kHz | 1 kHz | 2 kHz | 4 kHz |
| Soundproofing material 1 | Felt 1 | 7 | 18 | 47 | 8 | 18 | 50 | 7 | 9 | 49 |
| Soundproofing material 2 | Felt 2 | 7 | 17 | 48 | 8 | 18 | 48 | 7 | 24 | 53 |
| Soundproofing material 3 | Felt 3 | 9 | 35 | 56 | 7 | 21 | 53 | 6 | 15 | 43 |
| Soundproofing material 4 | Felt 4 | 6 | 12 | 38 | 7 | 21 | 46 | 7 | 13 | 41 |

TABLE 3-continued

| | | Sound proofing (normal incidence sound absorption) Unit: % | | | | | | | | |
|---|---|---|---|---|---|---|---|---|---|---|
| | Raw material | Initial | | | 170° C. × 500 hours | | | 200° C. × 500 hours | | |
| | felt | 1 kHz | 2 kHz | 4 kHz | 1 kHz | 2 kHz | 4 kHz | 1 kHz | 2 kHz | 4 kHz |
| Soundproofing material 5 | Felt 5 | Unmoldable and unmeasurable | | | | | | | | |
| Soundproofing material 6 | Felt 6 | Unmoldable and unmeasurable | | | | | | | | |

REFERENCE SIGNS LIST

1 Soundproofing material
2 Support

INDUSTRIAL APPLICABILITY

The present invention enables providing a soundproofing material that can be molded at a temperature below the melting point of a binder resin fiber having a high melting point (preferably, a melting point of 200° C. or more), and that has excellent heat resistance after being molded (preferably, heat resistance to 160 to 230° C.). The present invention also enables providing a felt used as a raw material of the soundproofing material. The soundproofing material of the present invention has excellent heat resistance because the unstretched thermoplastic resin contained in the raw material felt crystallizes in molding process, and shows the same melting point as that of a stretched thermoplastic resin fiber. The soundproofing material of the present invention is therefore suited as a soundproofing material for automobiles, and can be used in places requiring high heat resistance to temperatures of about 160 to 200° C., particularly in the vicinity of engines and engine pipes.

While the present invention has been described in detail and with reference to certain embodiments of the invention, it will be apparent to a skilled person that various changes and modifications may be made thereto without departing from the spirit and scope of the invention.

The invention claimed is:

1. A felt comprising:
   10 mass % to 90 mass % of an unstretched thermoplastic resin fiber; and
   10 mass % to 90 mass % of a stretched thermoplastic resin fiber, and
   having a thickness of 1 mm to 10 mm, and an areal weight of 50 g/m$^2$ to 1600 g/m$^2$.

2. The felt according to claim 1, wherein the unstretched thermoplastic resin fiber is an unstretched polyester fiber.

3. The felt according to claim 1, comprising 50 mass % to 80 mass % of the unstretched thermoplastic resin fiber, and further 20 mass % to 50 mass % of an inorganic fiber.

4. The felt according to claim 1, wherein the felt is a monolayer felt.

5. The felt according to claim 1, wherein the felt is combinable with a nonwoven fabric to which design or other functionality is imparted.

6. A soundproofing material molded from the felt of claim 1.

7. The soundproofing material according to claim 6, wherein the soundproofing material is heat resistant for temperatures of about 160 to 230 degrees Celsius.

8. The felt according to claim 1, wherein the areal weight of the felt is 500 g/m$^2$ to 1600 g/m$^2$.

9. The soundproofing material according to claim 6, wherein the soundproofing material is heat resistant for temperatures of about 160 to 200 degrees Celsius.

10. The felt according to claim 1, wherein the unstretched thermoplastic resin fiber has a glass transition point of 60 to 80 degrees Celsius.

11. The felt according to claim 1, comprising:
    50 mass % to 80 mass % of the unstretched thermoplastic resin fiber; and
    20 mass % to 50 mass % of the stretched thermoplastic resin fiber.

12. The felt according to claim 1, further comprising:
    10 mass % to 90 mass % of a low-melting-point fiber.

13. The felt according to claim 1, further comprising:
    20 mass % to 50 mass % of a low-melting-point fiber.

14. The felt according to claim 1,
    wherein the unstretched thermoplastic resin fiber has a stretch rate of 1 to 1.5 times, and
    wherein the stretched thermoplastic resin fiber has a stretch rate of 3 to 5 times.

15. The felt according to claim 1,
    wherein the unstretched thermoplastic resin fiber has a glass transition point of 80° C., and
    wherein the stretched thermoplastic resin fiber has a melting point of 254° C.

16. A method for producing a soundproofing material, the method comprising a step of molding the felt of claim 1 at a temperature below a melting point of the stretched thermoplastic resin fiber made of a thermoplastic resin the same as the unstretched thermoplastic resin fiber contained in the felt.

* * * * *